US011050928B2

United States Patent
Sakaida et al.

(10) Patent No.: US 11,050,928 B2
(45) Date of Patent: Jun. 29, 2021

(54) IMAGE CAPTURING CONTROL APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventors: Minoru Sakaida, Kawasaki (JP); Yasushi Ohwa, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/001,839

(22) Filed: Aug. 25, 2020

(65) Prior Publication Data
US 2021/0067691 A1 Mar. 4, 2021

(30) Foreign Application Priority Data
Aug. 27, 2019 (JP) .............................. JP2019-154972

(51) Int. Cl.
*H04N 5/232* (2006.01)
*H04N 5/235* (2006.01)
*H04N 5/77* (2006.01)

(52) U.S. Cl.
CPC ....... *H04N 5/23229* (2013.01); *H04N 5/2353* (2013.01); *H04N 5/23254* (2013.01); *H04N 5/772* (2013.01)

(58) Field of Classification Search
CPC ............. H04N 5/23229; H04N 5/2353; H04N 5/23254; H04N 5/23248; H04N 5/772; H04N 5/232939
See application file for complete search history.

(56) References Cited

U.S. PATENT DOCUMENTS

| 8,488,022 B2 * | 7/2013 | Nozaki | H04N 5/23248 348/231.99 |
| 2014/0009639 A1 * | 1/2014 | Lee | H04N 5/232 348/229.1 |
| 2014/0160320 A1 * | 6/2014 | Babale | H04N 5/232939 348/239 |
| 2014/0286627 A1 * | 9/2014 | Kato | H04N 5/772 386/278 |

(Continued)

FOREIGN PATENT DOCUMENTS

JP 2012-044566 A 3/2012

*Primary Examiner* — Hung H Lam
(74) *Attorney, Agent, or Firm* — Cowan, Liebowitz & Latman, P.C.

(57) ABSTRACT

There is provided an image capturing control apparatus. A first control unit performs control to repeatedly obtain an evaluation image using an image sensor. The evaluation image is used to obtain an evaluation value for controlling at least one of image capturing and development. An obtaining unit obtains the evaluation value on the basis of the evaluation image. A second control unit performs control to temporarily stop the obtainment of the evaluation image and use the image sensor to obtain, during a stopped period, a still image for recording. A generating unit generates an estimated evaluation image corresponding to the stopped period on the basis of two or more evaluation images obtained outside the stopped period. For the stopped period, the obtaining unit obtains the evaluation value on the basis of the estimated evaluation image.

15 Claims, 14 Drawing Sheets

(56) References Cited

U.S. PATENT DOCUMENTS

| | | | |
|---|---|---|---|
| 2017/0142335 A1* | 5/2017 | Matsumoto | H04N 5/23254 |
| 2019/0020813 A1* | 1/2019 | Hagiwara | H04N 5/2254 |
| 2021/0009270 A1* | 1/2021 | Chen | B64D 47/08 |

* cited by examiner

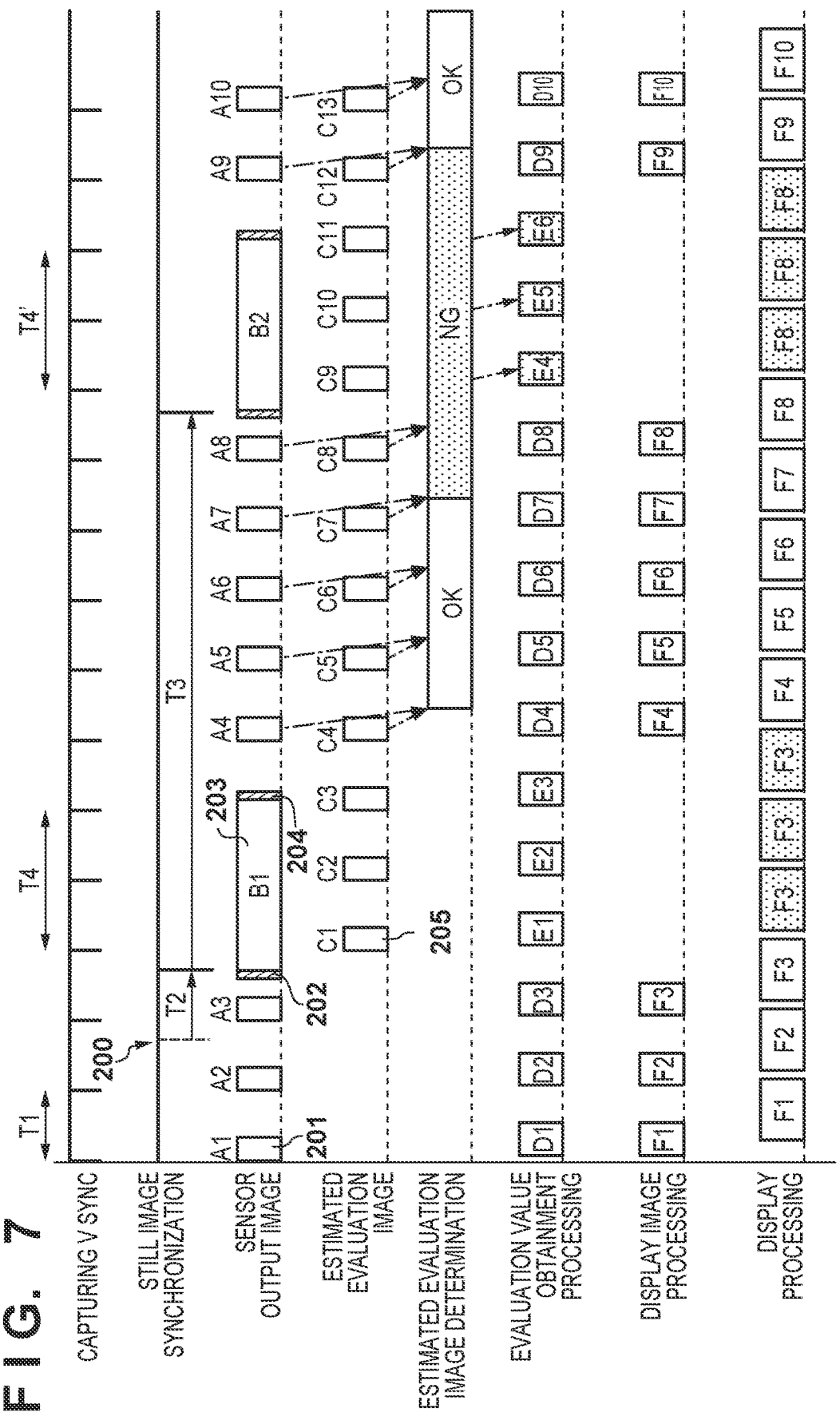

IMAGE CAPTURING CONTROL APPARATUS, IMAGE CAPTURING APPARATUS, CONTROL METHOD, AND STORAGE MEDIUM

BACKGROUND OF THE INVENTION

Field of the Invention

The present invention relates to an image capturing control apparatus, an image capturing apparatus, a control method, and a storage medium.

Description of the Related Art

Some image capturing apparatuses have functions for obtaining various information required for shooting (evaluation values) by analyzing shot images. This "various information required for shooting (evaluation values)" is information pertaining to, for example, autofocus, exposure, white balance, motion, a subject, and the like. Generally speaking, an image used to obtain evaluation values (called an "evaluation image" hereinafter) is captured at constant intervals, such as 60 frames per second. The image capturing apparatus obtains the evaluation values for each evaluation image, and then shoots a still image on the basis of the evaluation values which have been found.

However, if the image capturing apparatus only has one image sensor, the image sensor must output both still image data and evaluation image data, and thus driving for an evaluation image cannot be carried out during driving for a still image. When performing continuous shooting, the time of the driving for a still image will overlap with the time of the driving for an evaluation image, depending on the release timing and the continuous shooting interval. As a result, the evaluation image output cannot be obtained, and thus the evaluation values cannot be obtained while a still image is being shot.

Japanese Patent Laid-Open No. 2012-44566 discloses a technique which switches the output to be used in a display between an output for display and an output for a still image. By using this technique, an evaluation image is generated by, for example, reducing the output for a still image during continuous shooting, which makes it possible to obtain evaluation values while shooting a still image. Evaluation values can therefore be obtained frequently, even during continuous shooting.

However, generally speaking, shooting conditions such as exposure settings are determined on the basis of different standards depending on whether the shooting is for display or for capturing a still image. Thus if an evaluation image is generated from the output for a still image as described in Japanese Patent Laid-Open No. 2012-44566, the quality of the evaluation image will vary discontinuously between the still image shooting period and the other period, and thus consistent evaluation value cannot be obtained in a continuous manner.

SUMMARY OF THE INVENTION

Having been conceived in light of such circumstances, the present invention provides a technique which makes it possible to obtain, for a period in which the obtainment of evaluation images is stopped, an evaluation value which is more consistent with an evaluation value obtained in a period in which the obtainment of evaluation images is not stopped.

According to a first aspect of the present invention, there is provided an image capturing control apparatus comprising at least one processor and/or at least one circuit which functions as: a first control unit configured to perform control to repeatedly obtain an evaluation image using an image sensor, the evaluation image being used to obtain an evaluation value for controlling at least one of image capturing and development; an obtaining unit configured to obtain the evaluation value on the basis of the evaluation image; a second control unit configured to perform control to temporarily stop the obtainment of the evaluation image and use the image sensor to obtain, during a stopped period, a still image for recording; and a generating unit configured to generate an estimated evaluation image corresponding to the stopped period on the basis of two or more evaluation images obtained outside the stopped period, wherein for the stopped period, the obtaining unit obtains the evaluation value on the basis of the estimated evaluation image.

According to a second aspect of the present invention, there is provided an image capturing apparatus, comprising: the image capturing control apparatus according to the first aspect; and the image sensor.

According to a third aspect of the present invention, there is provided a control method executed by an image capturing control apparatus, comprising: performing control to repeatedly obtain an evaluation image using an image sensor, the evaluation image being used to obtain an evaluation value for controlling at least one of image capturing and development; obtaining the evaluation value on the basis of the evaluation image; performing control to temporarily stop the obtainment of the evaluation image and use the image sensor to obtain, during a stopped period, a still image for recording; and generating an estimated evaluation image corresponding to the stopped period on the basis of two or more evaluation images obtained outside the stopped period, wherein for the stopped period, the evaluation value is obtained on the basis of the estimated evaluation image.

According to a fourth aspect of the present invention, there is provided a non-transitory computer-readable storage medium which stores a program for causing a computer to execute a control method comprising: performing control to repeatedly obtain an evaluation image using an image sensor, the evaluation image being used to obtain an evaluation value for controlling at least one of image capturing and development; obtaining the evaluation value on the basis of the evaluation image; performing control to temporarily stop the obtainment of the evaluation image and use the image sensor to obtain, during a stopped period, a still image for recording; and generating an estimated evaluation image corresponding to the stopped period on the basis of two or more evaluation images obtained outside the stopped period, wherein for the stopped period, the evaluation value is obtained on the basis of the estimated evaluation image.

Further features of the present invention will become apparent from the following description of exemplary embodiments with reference to the attached drawings.

BRIEF DESCRIPTION OF THE DRAWINGS

FIG. 7 is a timing chart pertaining to evaluation value obtainment during continuous still image shooting, according to the second embodiment.

DESCRIPTION OF THE EMBODIMENTS

Figure 1:
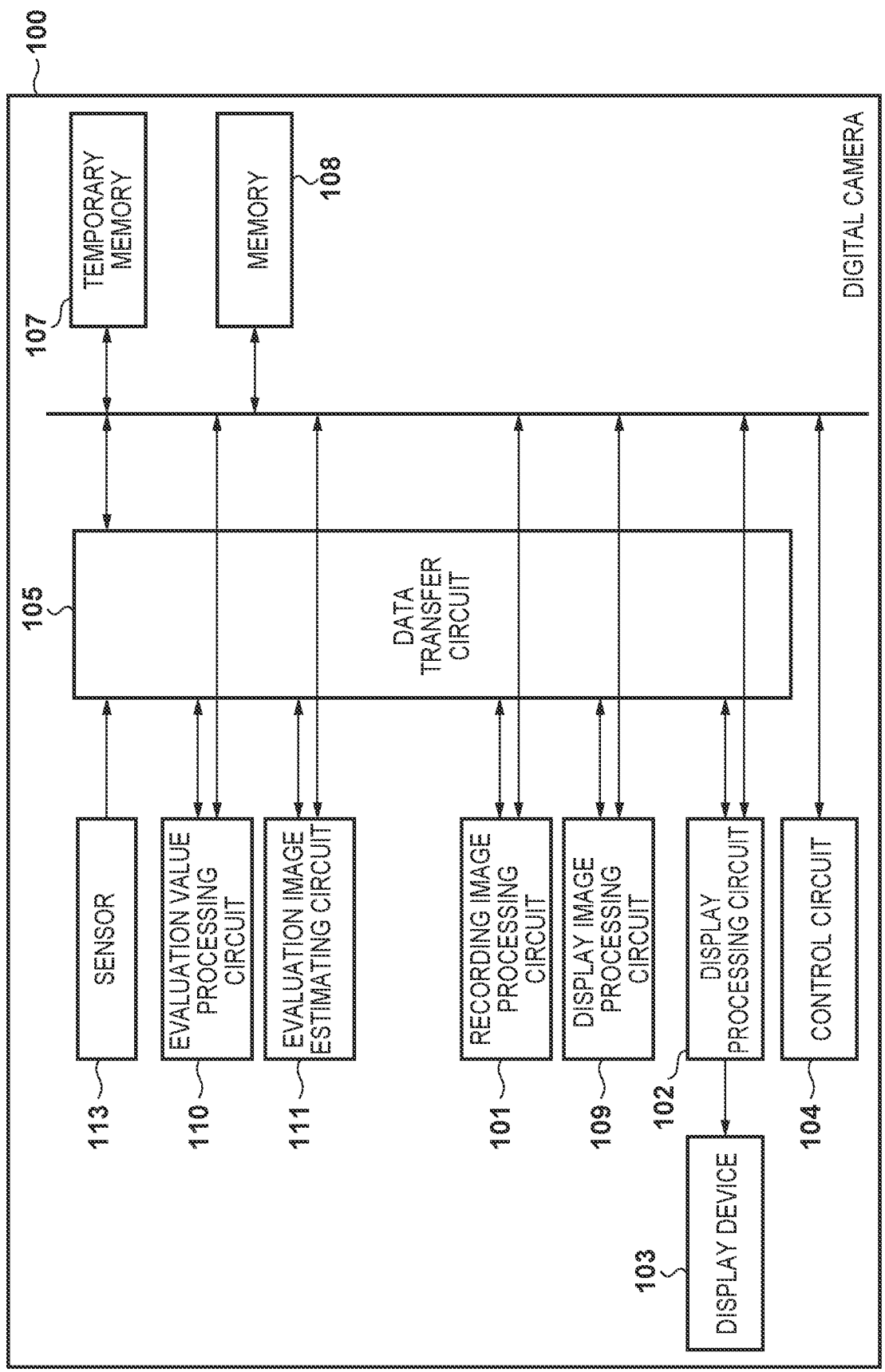
FIG. 1 is a block diagram illustrating the configuration of a digital camera 100 according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating the configuration of a digital camera 100, which is an example of an image capturing control apparatus. Note that the image capturing control apparatus according to the present embodiment is not limited to an image capturing apparatus such as a digital camera, and may be a digital video camera, a smartphone, a camera-equipped mobile phone, a vehicle-mounted camera, or the like.

The digital camera 100 includes a sensor 113, a recording image processing circuit 101, a display processing circuit 102, a display device 103, a control circuit 104, a data transfer circuit 105, a bus 106, a temporary memory 107, a memory 108, and a display image processing circuit 109. The digital camera 100 also includes an evaluation value processing circuit 110, an evaluation image estimating circuit 111, and an AD converter (not shown) which converts an analog signal from the sensor 113 into a digital signal. Additionally, the digital camera 100 includes a compression/decompression circuit (not shown) that compresses image data into, for example, the JPEG format or the MPEG format, decompresses compressed data, and so on. Furthermore, the digital camera 100 includes an external memory (not shown) that records image data in the JPEG format, the MPEG format, or the like into an external medium (not shown).

The sensor 113 is an image sensor, such as a CCD or a CMOS sensor, that creates image data by converting a received subject image into an electrical signal. The image data from the sensor 113 is written into the temporary memory 107 via the data transfer circuit 105.

The recording image processing circuit 101 generates a still image for recording. The recording image processing circuit 101 performs multiple types of image processing, such as pixel correction, black level correction, shading correction, defect correction, white balance adjustment, correction for chromatic aberration of magnification, gamma correction, luminance/color generation processing, geometric conversion, noise reduction, and enlargement/reduction. The recording image processing circuit 101 also performs appropriate image processing on the image data. Furthermore, the recording image processing circuit 101 is connected to the data transfer circuit 105, obtains the image data from the data transfer circuit 105, and writes data obtained from the image processing into the temporary memory 107 via the data transfer circuit 105.

The display image processing circuit 109 generates a live view image (LV image). Like the recording image processing circuit 101, the display image processing circuit 109 has a function for performing multiple types of image processing, but because it is necessary to finish generating the LV image during a display period, the display image processing circuit 109 is configured to perform simpler and faster image processing than the recording image processing circuit 101. Additionally, the display image processing circuit 109 is connected to the data transfer circuit 105, obtains the image data from the data transfer circuit 105, and outputs data obtained from the image processing to the display processing circuit 102 via the data transfer circuit 105. Furthermore, the display image processing circuit 109 includes a reduced image processing circuit (not shown), which generates an evaluation image by reducing the size of the generated LV image to QVGA or the like, and outputs the generated evaluation image to the evaluation value processing circuit 110 via the data transfer circuit 105.

Note that the reduced image processing circuit may be configured as a dedicated processing circuit more specialized for the generation of the evaluation image. Additionally, although the present embodiment describes the recording image processing circuit 101 and the display image processing circuit 109 as separate image processing circuits, a configuration in which time-division processing is performed by a common image processing circuit performing still image processing in a period where the LV image processing is not being performed may be employed.

The evaluation value processing circuit 110 is connected to the data transfer circuit 105, and obtains an evaluation value on the basis of the evaluation image output from the display image processing circuit 109 or an estimated evaluation image output from the evaluation image estimating circuit 111.

The evaluation value is information for controlling at least one of image capturing and developing, and is information indicating one of a focus state, exposure, white balance, a subject type, and subject motion, for example. The evaluation value processing circuit 110 may obtain two or more types of evaluation values as well. For example, as the two or more types of evaluation values, the evaluation value processing circuit 110 obtains information indicating the type of the subject and a motion vector used to track the subject (the information indicating subject motion). In this case, the evaluation value processing circuit 110 performs processing for detecting a subject, such as a face, from the evaluation image or the estimated evaluation image (subject detection processing), and processing for detecting a motion vector of the detected subject (motion vector detection processing). Any known techniques can be used for the subject detection processing and the motion vector detection processing.

Although the present embodiment assumes that the evaluation value processing circuit 110 executes the evaluation value obtainment processing in the same period as the display period, the processing may be performed in a different period.

The evaluation image estimating circuit 111 performs processing for generating an estimated evaluation image to be input to the evaluation value processing circuit 110. The estimated evaluation image generating processing is performed on the basis of a training model.

Figure 3:
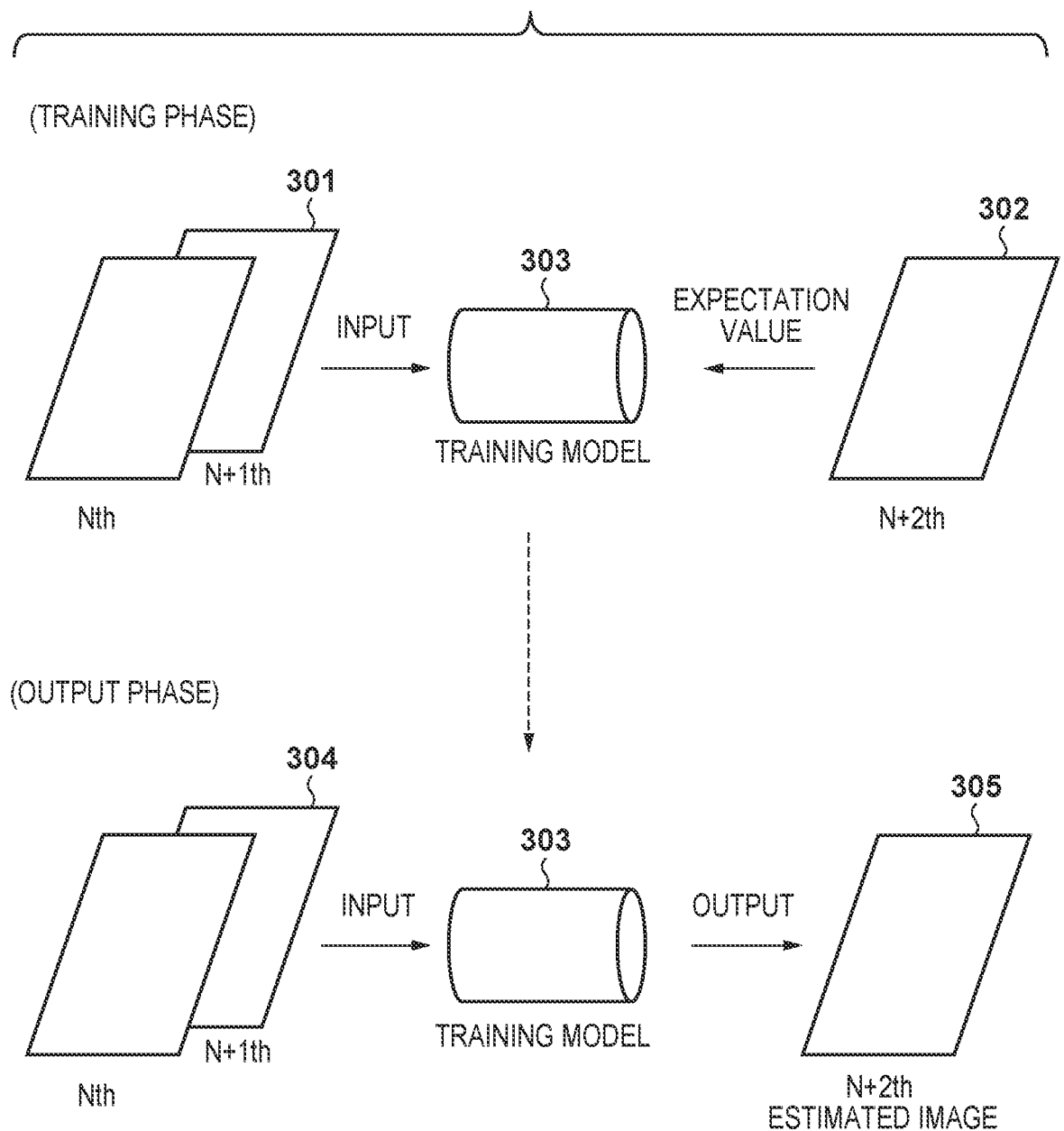
FIG. 3 is a diagram illustrating an overview of a training model for estimated evaluation image generating processing.

FIG. 3 is a diagram illustrating an overview of the training model for the estimated evaluation image generating processing. A known neural network model can be used for the training model. When two QVGA-sized images which are consecutive in the time direction are input to an input layer, a QVGA-sized image corresponding to the next frame of the input images is output from an output layer. In a training phase, the model being trained includes a training model 303, training data images 301, and a supervisory data image 302. The purpose of the training model 303 is to estimate the next evaluation image from a plurality of evaluation images which have already been obtained. As such, evaluation images which are consecutive in the time direction are used as the training data images 301 and the supervisory data image 302. With a QVGA-sized moving image, for example, training is carried out so that when frame N and frame N+1 are used as the training data images 301, the supervisory data image 302 is frame N+2. In the present embodiment, the training phase is not performed during shooting, but is rather finished beforehand, and weighting data for each of edges, for example, is held in the memory 108 as coefficient data. Then, when the digital camera 100 is started up, the operating mode thereof is changed, or the like, the coefficient data held in the memory 108 is set in the training model 303 within the evaluation image estimating circuit 111 via the data transfer circuit 105. Once the coefficient data has been set in the training model 303, the processing moves to an output phase. In the output phase, the training model 303 takes two evaluation images 304, which are input via the data transfer circuit 105 and are consecutive in the time direction, and generates an estimated evaluation image 305 corresponding to the next frame, which is then output to the evaluation value processing circuit 110 via the data transfer circuit 105.

In the example illustrated in FIG. 3, the estimated evaluation image is generated on the basis of the two evaluation images. However, a configuration may be employed in which the estimated evaluation image is generated on the basis of more than two evaluation images.

The display processing circuit 102 is connected to the data transfer circuit 105, and obtains, via the data transfer circuit 105, the image data processed by the display image processing circuit 109. Then, the display processing circuit 102 executes a plurality of types of processing on the obtained image data, and transfers a display image to the display device 103. The plurality of types of processing may include, for example, processing for adding pixels of a fixed color (e.g., black) to the periphery of the display image so as to align the display image with the size of the display device 103. The plurality of types of processing may also include, for example, processing for embedding a shooting time and the like in display data (processing for superimposing what is known as On-Screen Display (OSD) images), processing for converting to a format compliant with the display device 103, and the like.

The display device 103 is, for example, a liquid crystal display (LCD), an EVF, or the like, and displays images input from the display processing circuit 102.

The control circuit 104 is constituted by a microcomputer or the like that handles the control of operations of the digital camera 100, and executes various types of control processing by making various instructions to the function blocks constituting the digital camera 100. The control circuit 104 controls the recording image processing circuit 101, the display processing circuit 102, the data transfer circuit 105, the temporary memory 107, and the memory 108, which are connected via the bus 106. The microcomputer executes the various types of processing described in the present embodiment by executing programs recorded in the memory 108.

The data transfer circuit 105 is constituted by a plurality of direct memory access controllers which transfer data, namely a WRDMAC and a RDDMAC. The image data is output to the bus 106 by the WRDMAC and is temporarily stored by the temporary memory 107. The image data stored by the temporary memory 107 is output to the bus 106 by the RDDMAC, and is then output to the recording image processing circuit 101 and the display processing circuit 102 connected to the data transfer circuit 105.

The bus 106 is constituted by a system bus and a data bus, and each of these is constituted by an independent bus.

The temporary memory 107 is constituted by a memory control circuit and memory, and writes data to the memory and reads out data from the memory in response to instructions from the control circuit 104 or the data transfer circuit 105. The memory is a storage device with a storage capacity sufficient for storing a predetermined number of still images, a predetermined time's worth of moving images, data such as audio, operation constants for the control circuit 104, programs, and the like, and is constituted by DRAM or the like. The memory can be constituted by multiple memories.

The memory 108 is constituted by a non-volatile memory control circuit and non-volatile memory. The non-volatile memory control circuit writes data into the non-volatile memory, reads out data from the non-volatile memory, and so on in response to instructions from the control circuit 104. The non-volatile memory is memory that can be recorded to and erased electrically, and is constituted by, for example, EEPROM or the like. Operation constants for the control circuit 104, programs, the coefficient data, learned beforehand, which is set in the evaluation image estimating circuit 111, and so on are stored in the non-volatile memory.

Figure 2:
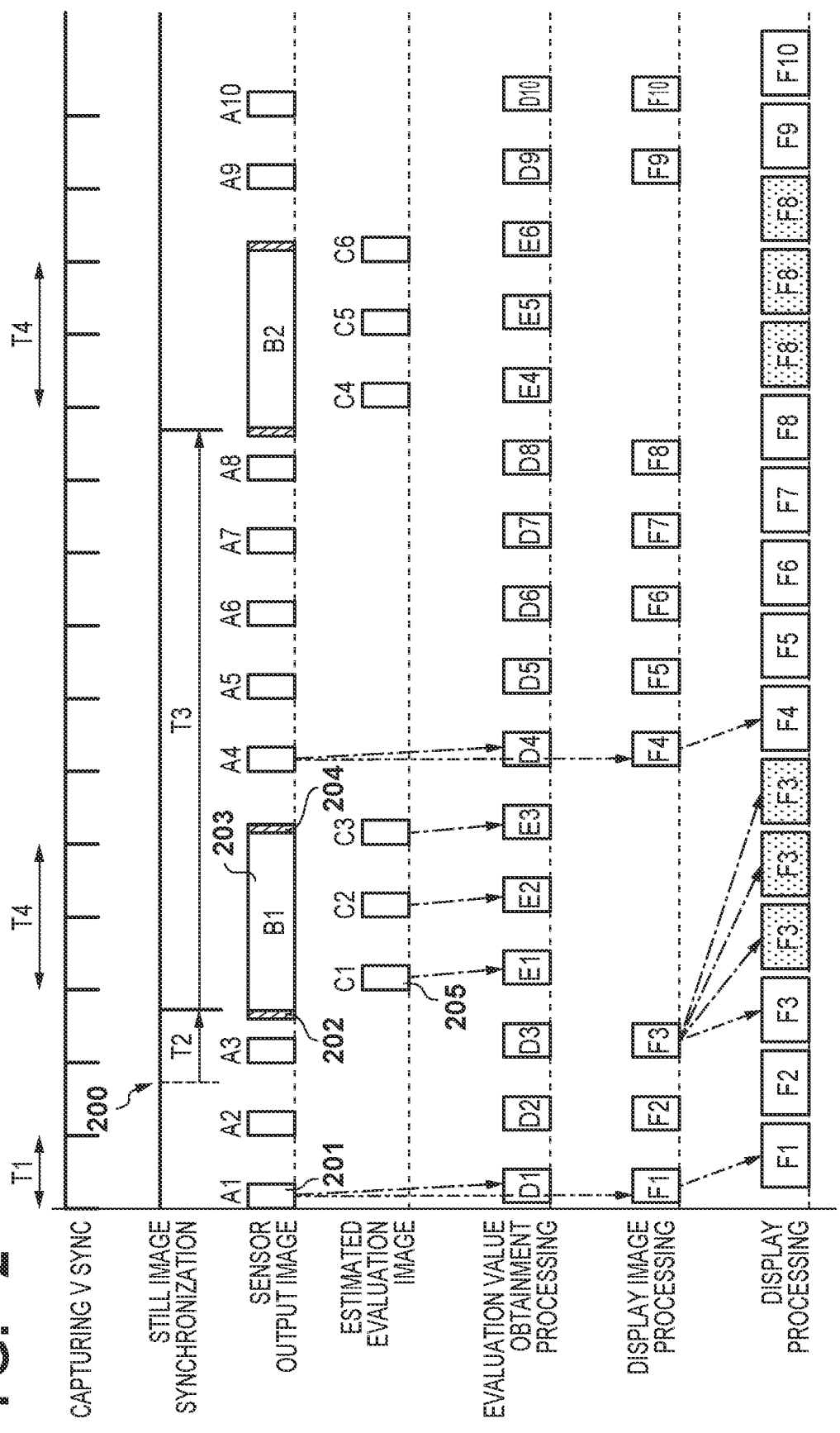
FIG. 2 is a timing chart pertaining to evaluation value obtainment during continuous still image shooting, according to the first embodiment.

FIG. 2 is a timing chart pertaining to evaluation value obtainment during continuous still image shooting. In FIG. 2, the items arranged in the vertical direction indicate various types of timing signals or processing timings, and the horizontal direction corresponds to time. Each item will be described hereinafter.

"Capturing V sync" indicates the timing of a vertical synchronization signal for developing performed to obtain the evaluation image, and the synchronization signal is generated at a cycle of, for example, 60 frames per second (a predetermined cycle) (and thus period T1 corresponds to 1/60 seconds). The evaluation image obtained here also serves as the LV image. Thus in the example illustrated in FIG. 2, LV display and evaluation value obtainment are performed in the same cycle. However, the LV display and the evaluation value obtainment may be carried out in different cycles (e.g., the evaluation value obtainment may be accelerated to 120 frames per second). Period T4 indicates a period which overlaps with a period for reading out a still image for recording (described later) and in which the evaluation image therefore cannot be obtained (a period in which the evaluation image obtainment stops temporarily).

"Still image sync" indicates the timing at which the still image for recording (also simply called a "still image" hereinafter) is read out, and a synchronization signal is generated every continuous shooting interval T3. Timing 200 indicates a timing at which a user presses a shutter button, and the still image synchronization signal is generated after a release time T2 has passed. The continuous shooting interval T3 is adjusted in accordance with a sensor output image period used in still image shooting.

"Sensor output image" indicates the timings at which image readout from the sensor 113 starts and stops, and a sensor switch time. Evaluation images A1 to A10 will be collectively called "evaluation image 201", and still images B1 and B2 will be collectively called "still image 203". A hatched box 202 indicates a time when the sensor 113 switches from the evaluation image 201 to the still image 203, and a hatched box 204 indicates a time for the sensor 113 switches from the still image 203 to the evaluation image 201. The lengths of the times between the evaluation image 201 and the still image 203 differ because the evaluation image 201 and the still image 203 have different numbers of pixels and exposure times.

"Estimated evaluation image" indicates the timings of the start and end of the estimated evaluation image generating processing performed by the evaluation image estimating circuit 111. The estimated evaluation image generating processing is executed every capturing V sync during the period when the obtainment of the evaluation image 201 is stopped, indicated by the period T4. Estimated evaluation images C1 to C6 will be collectively called an "estimated evaluation image 205".

Figure 5:
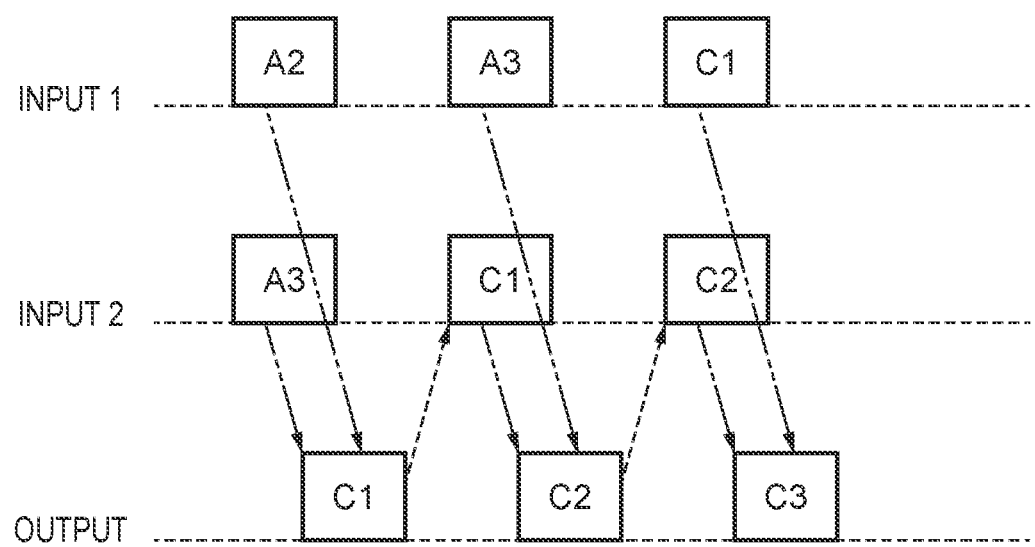
FIG. 5 is a diagram illustrating timings of input/output images in the estimated evaluation image generating processing.

FIG. 5 is a diagram illustrating timings of input/output images in the estimated evaluation image generating processing, and indicates images of input 1 and input 2 being input to the evaluation image estimating circuit 111, and the estimated evaluation image then being output. As described earlier, the two evaluation images which are consecutive in the time direction, held in the temporary memory 107, are input to the evaluation image estimating circuit 111 via the data transfer circuit 105. In the example illustrated in FIG. 5, first, when the first estimated evaluation image C1 is generated, the evaluation image A2 and the evaluation image A3 are input. Next, when the second estimated evaluation image C2 is generated, the evaluation image A3 and the estimated evaluation image C1 are input. When the third estimated evaluation image C3 is generated, the estimated evaluation image C1 and the estimated evaluation image C2 are input. In the present embodiment, when generating the second and third estimated evaluation images C2 and C3, one or two of the evaluation images from immediately previous are lacking, and thus the immediately-previous estimated evaluation images are input instead of the evaluation images which are lacking.

"Evaluation value obtainment processing" indicates timings of the start and end of evaluation value obtainment processing performed by the evaluation value processing circuit 110. The evaluation value obtainment processing is executed at a cycle corresponding to the "capturing V sync". The evaluation value obtainment processing is not stopped even during the period when the obtainment of the evaluation image 201 is stopped. In the periods where the evaluation image 201 can be obtained (the periods where the evaluation images A1 to A10 are obtained in FIG. 2), the evaluation value processing circuit 110 obtains evaluation values on the basis of the evaluation image 201 (evaluation values D1 to D10). On the other hand, in the period where the obtainment of the evaluation image 201 is stopped, the evaluation value processing circuit 110 obtains evaluation values (evaluation values E1 to E6) on the basis of the estimated evaluation image 205 generated by the evaluation image estimating circuit 111 (the estimated evaluation images C1 to C6).

Although the evaluation image estimating circuit 111 according to the present embodiment is configured to use an evaluation image obtained before the period in which the obtainment of the evaluation image 201 is stopped to predict the evaluation image corresponding to that stopped period (that is, generate the estimated evaluation image), the present embodiment is not limited to this configuration. For example, if it is acceptable for the timing of the evaluation value obtainment to be delayed, a configuration may be employed in which an interpolated image (estimated evaluation image) corresponding to the stopped period is generated on the basis of interpolation processing based on two evaluation images obtained before and after the stopped period, and the evaluation value is obtained from the interpolated image.

"Display image processing" indicates timings of the start and end of image processing performed by the display image processing circuit 109. The evaluation image 201 (evaluation images A1 to A10) read out from the sensor 113 are recorded into the temporary memory 107, and transferred to the display image processing circuit 109 via the data transfer circuit 105. The display image processing circuit 109 records display images F1 to F10, generated through image processing, into the temporary memory 107 again, via the data transfer circuit 105. The display images F1 to F10 indicate that the display image processing circuit 109 has started processing before an entire screen's worth of image data from the sensor 113 has been recorded into the temporary memory 107. The data transfer circuit 105 performs control for using the display image processing circuit 109 to transfer only the image data read out from the sensor 113. In other words, the display image processing circuit 109 is controlled so that no image data is read out before the image data read out from the sensor 113 is stored in the temporary memory 107. The display image processing circuit 109 does not perform processing in the period where the obtainment of the evaluation image 201 is stopped, indicated by the period T4.

Although not illustrated, "recording image processing", which corresponds to timings of the start and end of image processing performed by the recording image processing circuit 101, also exists. The still images B1 and B2 read out from the sensor 113 are recorded into the temporary memory 107, and input to the recording image processing circuit 101 via the data transfer circuit 105. The recording image processing circuit 101 records the processed still images into the temporary memory 107 again, via the data transfer circuit 105. The recording image processing circuit 101 performs the processing on the still images B1 and B2 after an entire screen's worth of image data from the sensor 113 is recorded into the temporary memory 107. Alternatively, if the system bandwidth is sufficient, the still images B1 and B2 may, like the display images F1 to F10, be read out by the recording image processing circuit 101 during the readout from the sensor 113.

Although not illustrated, "display V sync", which corresponds to the timing of a vertical synchronization signal for starting the display in the display device 103, also exists. For example, a timing signal for displaying images of 60 frames per second exists. Note that "display V sync" is generated at timings such that the delay of the timing at which the system makes a display in the display device 103 from the sensor output image is shortest. In other words, the "display V sync" occurs with a delay corresponding to a set period following the "capturing V sync".

"Display processing" indicates a timing at which an image processed by the display processing circuit 102 is displayed in the display device 103. A display image F3 is displayed four times consecutively. The second to fourth display timings correspond to the period in which the obtainment of the evaluation image 201 is stopped, indicated by the period T4, and there is no display image (LV image) obtained in real time. Therefore, the display image F3 obtained immediately before that period is repeatedly displayed. The same applies to a display image F8.

Figure 4:
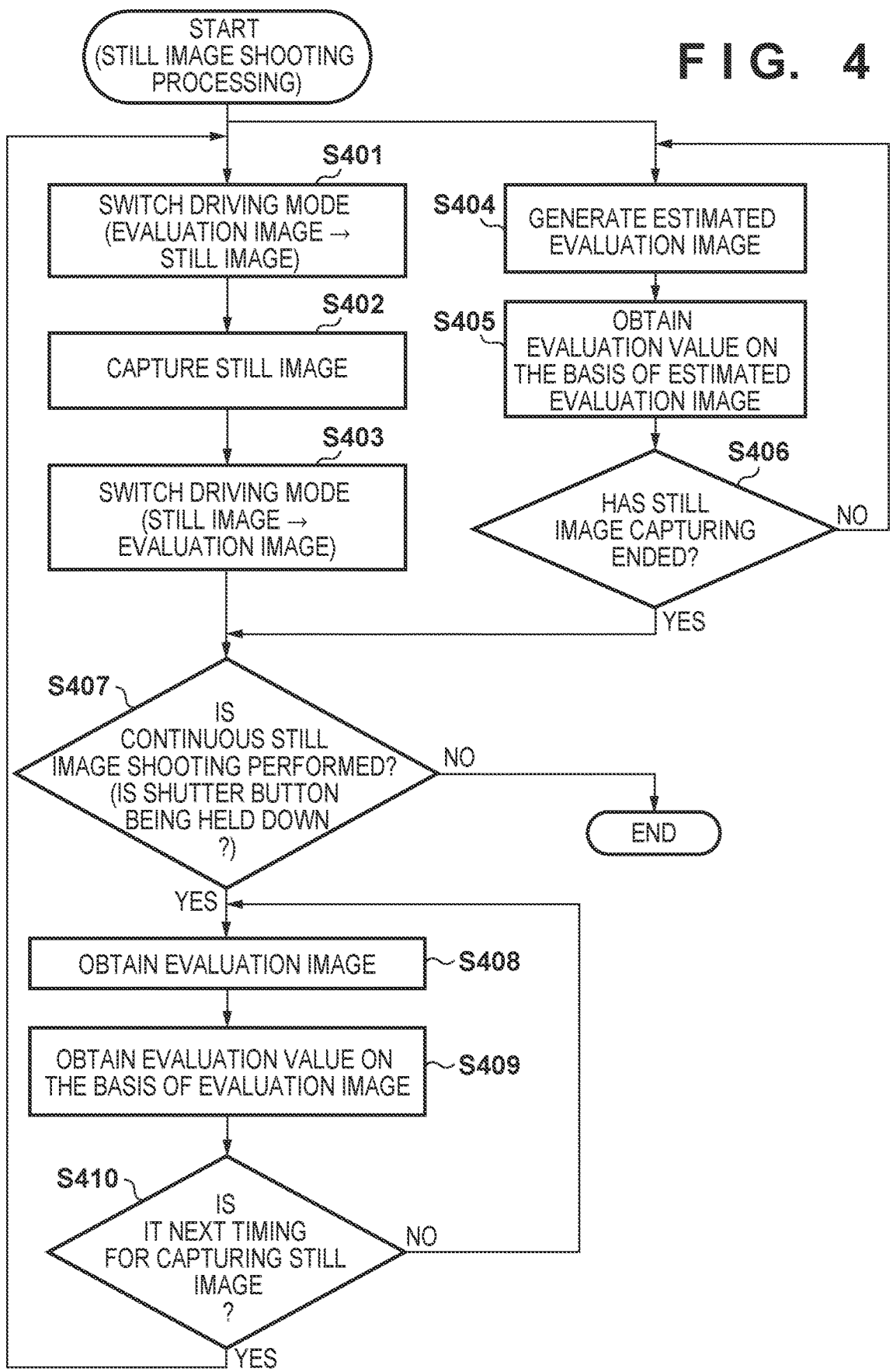
FIG. 4 is a flowchart illustrating still image shooting processing according to the first embodiment.

FIG. 4 is a flowchart illustrating the still image shooting processing. Unless otherwise specified, the processing of each step in this flowchart is realized by the control circuit 104 controlling the respective circuits of the digital camera 100 in accordance with programs stored in the memory 108. The processing of this flowchart starts when an instruction to capture a still image (e.g., the shutter button being pressed) is detected (see timing 200 in FIG. 2) and the first still image synchronization signal is detected. The control of the "sensor output image", the "estimated evaluation image", and the "evaluation value obtainment processing" in the timing chart in FIG. 2 is performed according to this flowchart.

Note that before the processing of this flowchart is started, the control circuit 104 repeatedly executes the same processing as that of steps S408 and S409 (described later) to repeatedly obtain evaluation images and evaluation values (e.g., the evaluation images A1 to A3 and the evaluation values D1 to D3 in FIG. 2).

In step S401, the control circuit 104 switches a driving mode of the sensor 113 from an evaluation image obtainment driving mode to a still image shooting driving mode (e.g., the hatched box 202 in FIG. 2).

In step S402, the control circuit 104 captures the first still image (e.g., the still image B1 in FIG. 2).

In step S403, the control circuit 104 switches the driving mode of the sensor 113 from the still image shooting driving mode to the evaluation image obtainment driving mode (e.g., the hatched box 204 in FIG. 2).

The processing of steps S404 to S406 is executed in parallel with the processing of steps S401 to S403. The processing of steps S404 and S405 is repeatedly executed at the cycle of the capturing V sync until it is determined, in step S406, that the capturing of a still image has ended.

Specifically, in step S404, the control circuit 104 generates the estimated evaluation image (e.g., the estimated evaluation images C1 to C3 in FIG. 2). As described earlier with reference to FIG. 5, the estimated evaluation image is generated on the basis of the evaluation images or the estimated evaluation images corresponding to two timings immediately before the capturing V sync.

In step S405, the control circuit 104 obtains the evaluation value on the basis of the estimated evaluation image (e.g., the evaluation values E1 to E3 in FIG. 2).

In step S406, the control circuit 104 determines whether or not the still image capturing has ended. The still image capturing having ended indicates that the processing of step S403 has ended. If the still image capturing has ended, the sequence moves to step S407, and if not, the sequence returns to step S404.

In step S407, the control circuit 104 determines whether or not continuous still image shooting is being performed. For example, if the shutter button is being held down, the control circuit 104 determines that continuous still image shooting is being performed, and if not, the control circuit 104 determines that continuous still image shooting is not being performed. If continuous still image shooting is being performed, the sequence moves to step S408, and if not, the processing of the flowchart ends.

The processing of steps S408 and S409 is repeatedly executed at the cycle of the capturing V sync until it is determined, in step S410, that it is time to capture the next still image.

Specifically, in step S408, the control circuit 104 captures the evaluation image (e.g., the evaluation images A4 to A8 in FIG. 2).

In step S409, the control circuit 104 obtains the evaluation value on the basis of the evaluation image (e.g., the evaluation values D4 to D8 in FIG. 2).

In step S410, the control circuit 104 determines whether the next timing for capturing a still image has been reached. The "next timing for capturing a still image" is, for example, a timing at which the period T3 has passed following the immediately-previous timing for capturing a still image. If the next timing for capturing a still image has been reached, the sequence moves to steps S401 and S404, where a still image is generated, an estimated evaluation image is generated, an evaluation value is obtained, and so on again (e.g., the still image B2, the estimated evaluation images C4 to C6, and the evaluation values E4 to E6 in FIG. 2). If the next timing for capturing a still image has not been reached, the sequence returns to step S408.

Note that the control circuit 104 may obtain two or more types of evaluation values in steps S405 and S409. If, for example, a configuration is employed in which, on the basis of an evaluation value obtained in a period aside from the period in which the obtainment of the evaluation image is stopped, an evaluation value corresponding to the stopped period is obtained (estimated), it is necessary to prepare estimation algorithms that handle the respective types in order to obtain the two or more types of evaluation values. In other words, as the number of types of evaluation values to be obtained increases, so too does the number of estimation algorithms. However, according to the present embodiment, while it is necessary to prepare an estimation algorithm for generating the estimated evaluation image, two or more types of evaluation values can be obtained from the estimated evaluation image, in the same manner as with the evaluation image, which makes it possible to greatly suppress the number of estimation algorithms which are required.

As described thus far, according to the first embodiment, on the basis of two or more evaluation images obtained outside a period in which the obtainment of evaluation images is stopped, the digital camera 100 generates an estimated evaluation image corresponding to the stopped period. Then, for the stopped period, the digital camera 100 obtains an evaluation value on the basis of the estimated evaluation image. This makes it possible to obtain, for a period in which the obtainment of evaluation images is stopped, an evaluation value which is more consistent with the evaluation value obtained in a period in which the obtainment of evaluation images is not stopped.

Furthermore, as illustrated in FIG. 2, the digital camera 100 repeatedly obtains the evaluation images at the cycle of the capturing V sync (a predetermined cycle), and generates the estimated evaluation image so that the estimated evaluation image corresponds to a timing synchronized with the cycle of the capturing V sync within the period in which the obtainment of evaluation images is stopped. This makes it possible to obtain an evaluation value corresponding to a timing synchronized with the same cycle, both inside and outside the period in which the obtainment of evaluation images is stopped, which improves the consistency of control using the evaluation value.

Second Embodiment

Figure 6:
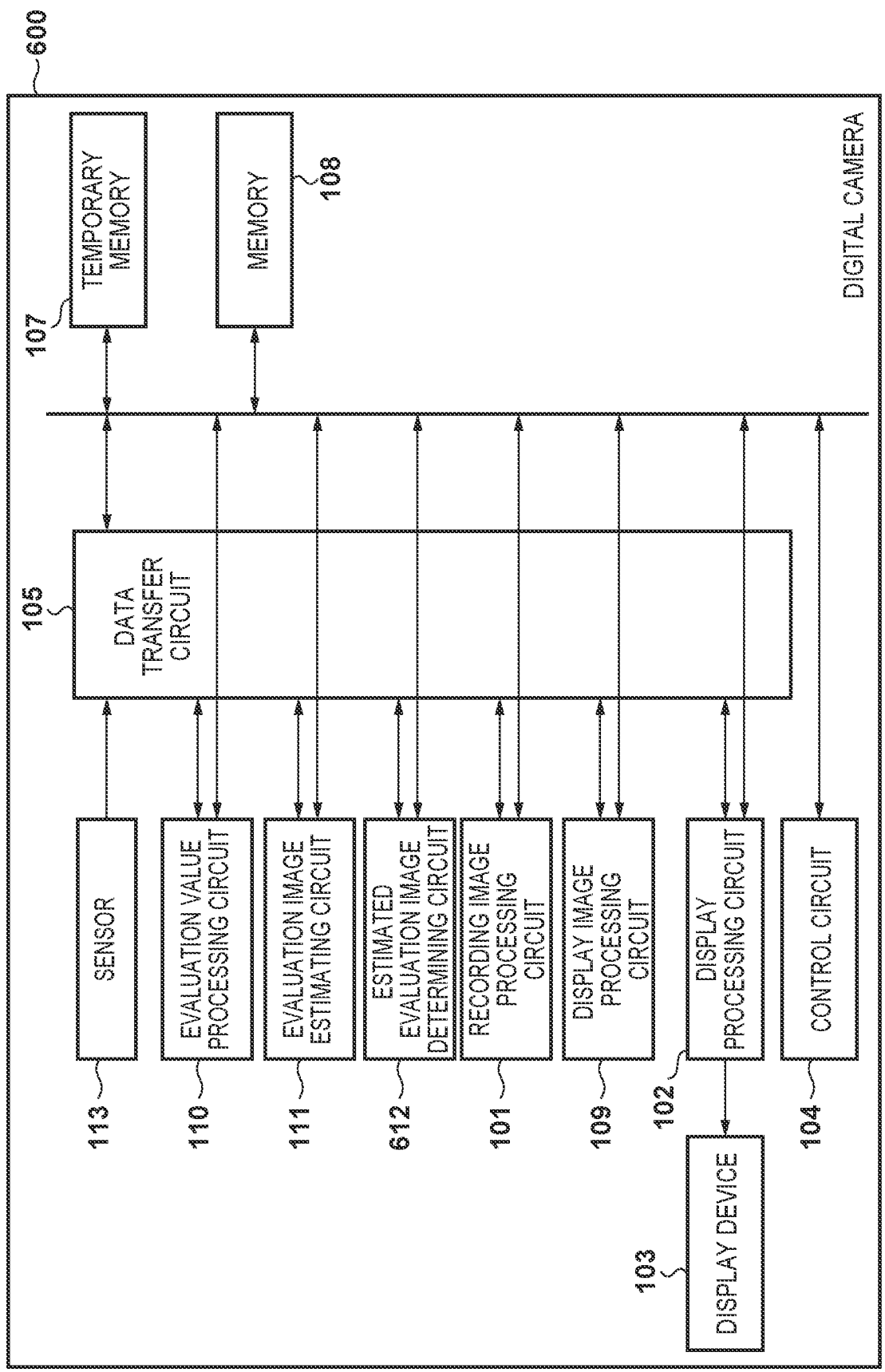
FIG. 6 is a block diagram illustrating the configuration of a digital camera 600 according to a second embodiment.

FIG. 6 is a block diagram illustrating the configuration of a digital camera 600 according to a second embodiment. An estimated evaluation image determining circuit 612 performs processing for comparing the estimated evaluation image generated by the evaluation image estimating circuit 111 with an evaluation image captured at the same time, and determining whether or not to use the estimated evaluation image.

Specifically, the estimated evaluation image determining circuit 612 finds, on a pixel-by-pixel basis, differences between the evaluation image and the estimated evaluation image input via the data transfer circuit 105, and calculates the sum of those differences. A method in which the sum is found after first reducing the amount of computations, such as zero-clipping the values of several of the least significant bits with respect to a difference value or reducing the difference value through shifting or division, may be used as the method for calculating the sum. Next, the estimated evaluation image determining circuit 612 compares the calculated sum with a threshold. The threshold indicates a permissible error of the estimated evaluation image with respect to the evaluation image which is actually captured, and the estimated evaluation image is determined to be acceptable for use in obtaining the evaluation value if the sum is below the threshold.

The threshold is determined on the basis of a driving period for still image capturing. For example, if the driving period for still image capturing is long due to the still image exposure time being long or the like, the period in which the evaluation image cannot be obtained will become longer as well, which increases the number of times the estimated evaluation image is generated and increases the cumulative error. Accordingly, control can be performed for reducing the threshold so that evaluation values can be obtained over a long period, in a state where there is little error in the estimated evaluation image. Conversely, if the error already exceeds the threshold before the start of the driving period for still image capturing, skipping the generation of the estimated evaluation image makes it possible to avoid a situation in which an evaluation value having a high level of error is obtained on the basis of an estimated evaluation image having a high level of error.

A result of the determination by the estimated evaluation image determining circuit 612 is output to the control circuit 104 via the bus 106. On the basis of the determination result, the control circuit 104 switches the control of the evaluation image estimating circuit 111 and the evaluation value processing circuit 110 during still image capturing.

FIG. 7 is a timing chart pertaining to evaluation value obtainment during continuous still image shooting, according to the second embodiment. In FIG. 7, the items arranged in the vertical direction indicate various types of timing signals or processing timings, and the horizontal direction corresponds to time. The following will describe points which are different from the timing chart in FIG. 2.

"Estimated evaluation image" indicates the timings of the start and end of the estimated evaluation image generating processing performed by the evaluation image estimating circuit 111. Unlike the first embodiment (FIG. 2), in the present embodiment, the estimated evaluation image generating processing is executed every capturing V sync during the continuous still image shooting, even during a period in which the evaluation image is obtained (see estimated evaluation images C4 to C8). Note that a configuration may be employed in which the estimated evaluation image generating processing is executed even before the start of continuous shooting (the timings of evaluation images A1 to A3).

"Estimated evaluation image determination" indicates a timing at which the determination result from the estimated evaluation image determination processing performed by the estimated evaluation image determining circuit 612 is output. The estimated evaluation image determination processing is started once the capturing of the evaluation image 201 is complete and the generation of the estimated evaluation image 205 for that same time is also complete. In the example of FIG. 7, the estimated evaluation image determination processing is started upon the capturing of the evaluation image A4, immediately after the capturing of the still image B1 is complete, and the generation of the estimated evaluation image C4 corresponding to that same time, are complete. Thereafter, the estimated evaluation image determination processing is performed at the cycle of the capturing V sync, aside from a period T4'. In the example of FIG. 7, a difference between the evaluation image A7 and the estimated evaluation image C7, and a difference between the evaluation image A8 and the estimated evaluation image C8, exceed the threshold, and thus the determination result is "NG".

Note that the estimated evaluation image C4 is generated on the basis of the estimated evaluation images C2 and C3; the estimated evaluation image C5 is generated on the basis of the estimated evaluation image C3 and the evaluation image A4; and the estimated evaluation image C6 is generated on the basis of the evaluation images A4 and A5. In other words, when both the evaluation image and the estimated evaluation image are present at a timing corresponding to input 1 to the training model 303, the evaluation image is used as input 1, whereas when only the estimated evaluation image is present, the estimated evaluation image is used as input 1. The same applies to input 2.

"Evaluation value obtainment processing" indicates timings of the start and end of evaluation value obtainment processing performed by the evaluation value processing circuit 110. Unlike the first embodiment (FIG. 2), in the present embodiment, the evaluation value obtainment processing is not performed in the periods for capturing the second and subsequent still images (period T4') if the estimated evaluation image determination immediately previous (i.e., at the timing of the estimated evaluation image C8) is "NG". In other words, the evaluation values E4 to E6, indicated by the hatching in FIG. 7, are not obtained. On the other hand, if the estimated evaluation image determination is "OK", the evaluation values are obtained in the same manner as in the first embodiment (FIG. 2).

Note that as described above, a configuration may be employed in which the estimated evaluation image generating processing is executed even before the start of continuous shooting (the timings of evaluation images A1 to A3). In this case, a configuration may be employed in which the estimated evaluation image determination is performed before the start of continuous shooting as well (the timings of the evaluation images A1 to A3), and whether or not to perform the evaluation value obtainment processing is switched in accordance with the immediately-previous determination result in the period for capturing the first still image as will (the period T4).

Figure 8A:
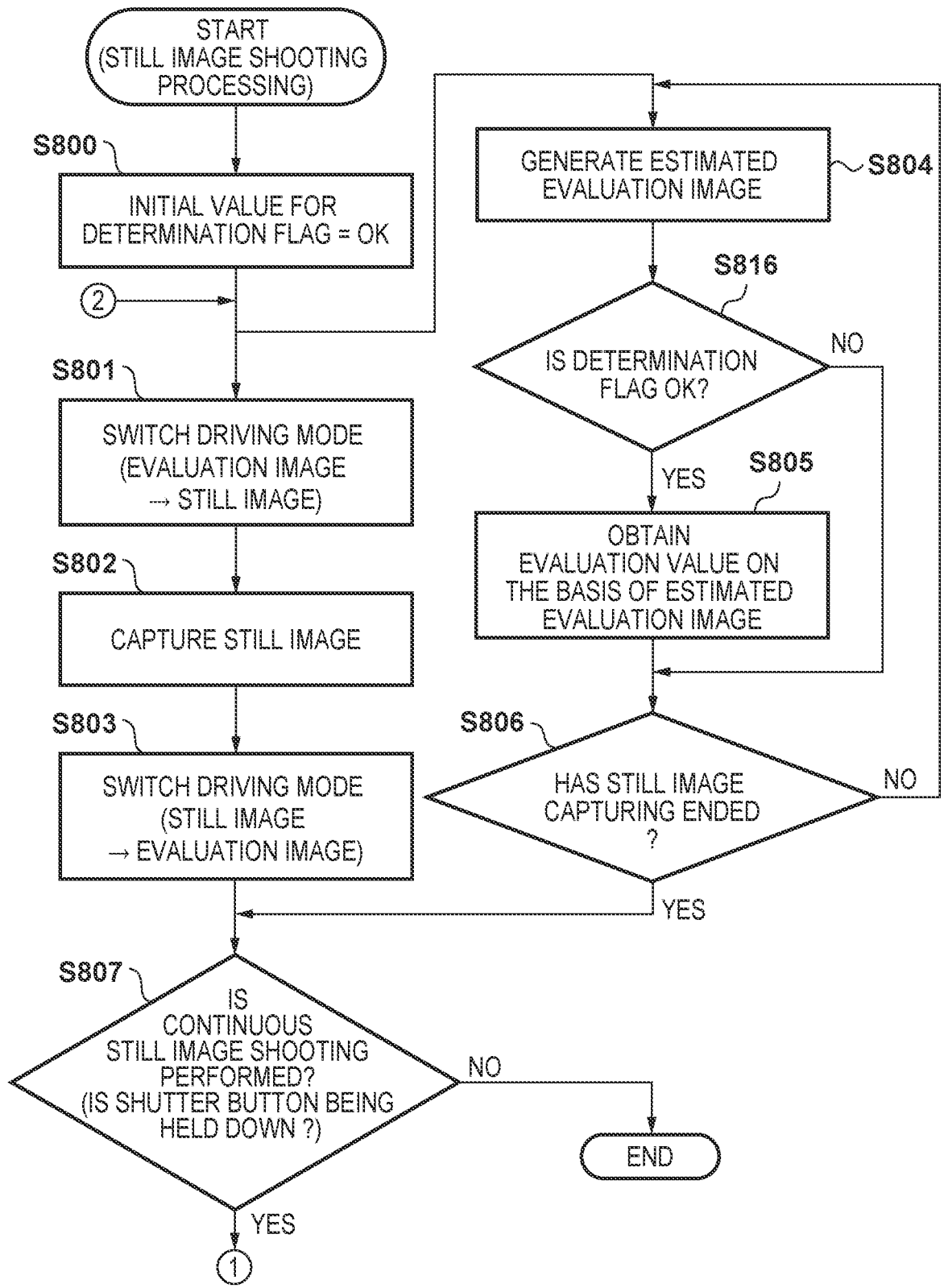
FIGS. 8A and 8B are flowcharts illustrating still image shooting processing according to the second embodiment.
Figure 8B:
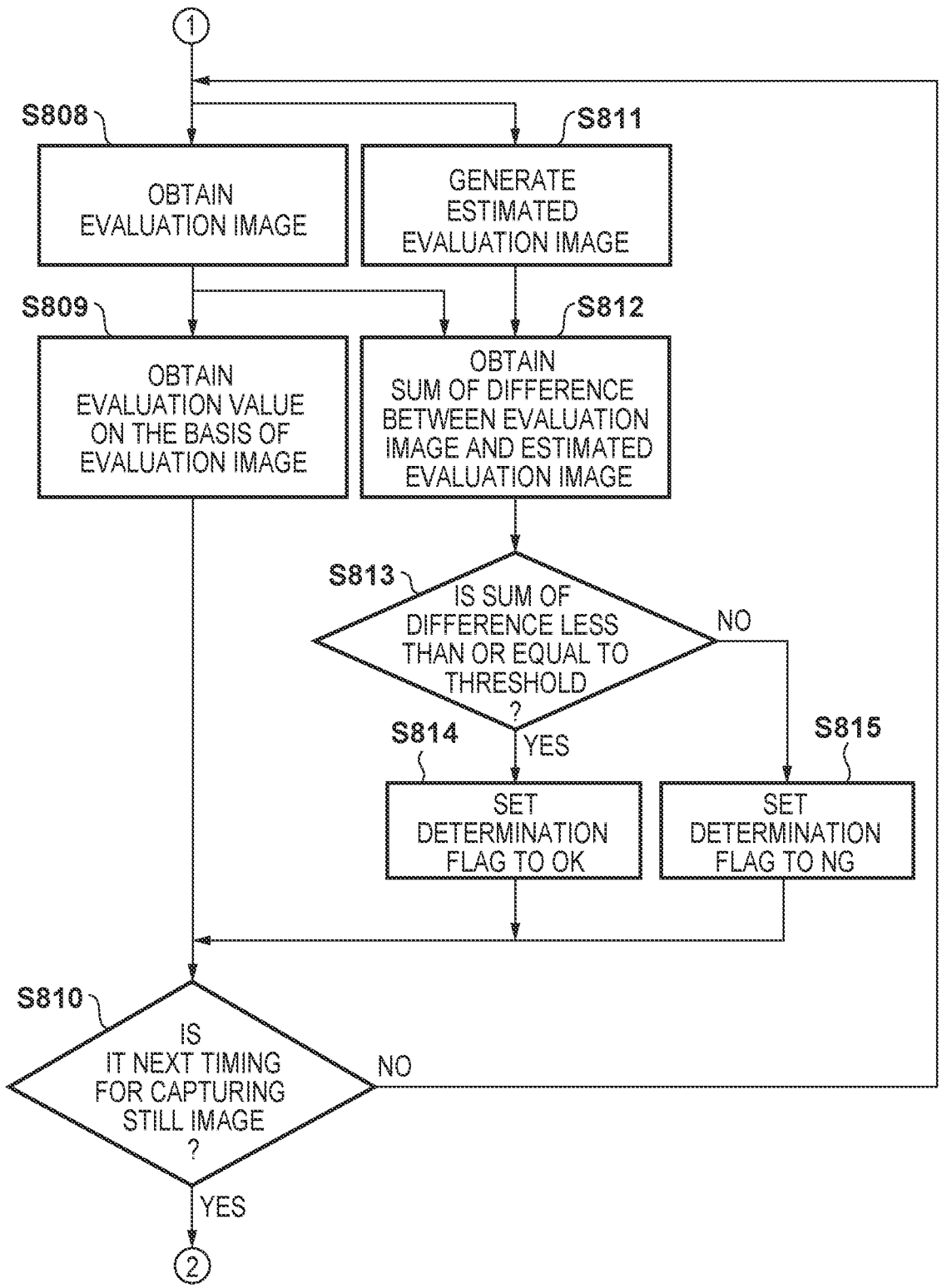

FIGS. 8A and 8B are flowcharts illustrating still image shooting processing according to the second embodiment. Unless otherwise specified, the processing of each step in this flowchart is realized by the control circuit 104 controlling the respective circuits of the digital camera 100 in accordance with programs stored in the memory 108. The processing of this flowchart starts when an instruction to capture a still image (e.g., the shutter button being pressed) is detected (see timing 200 in FIG. 7) and the first still image synchronization signal is detected. The control of the "sensor output image", the "estimated evaluation image", the "estimated evaluation image determination", and the "evaluation value obtainment processing" in the timing chart in FIG. 7 is performed according to this flowchart.

Note that the processing of steps S801 to S810 is the same as the processing of steps S401 to S410 in FIG. 4. Additionally, before the processing of this flowchart is started, the control circuit 104 repeatedly executes the same processing as that of steps S808 and S809 to repeatedly obtain evaluation images and evaluation values (e.g., the evaluation images A1 to A3 and the evaluation values D1 to D3 in FIG. 7).

In step S800, the control circuit 104 sets an initial value for the estimated evaluation image determination result (determination flag). In the present embodiment, the evaluation value obtainment processing is performed using the estimated evaluation image for the capturing of the first still image, and thus the initial value is "OK".

The processing of steps S811 to S815 is executed repeatedly at the cycle of the capturing V sync, in parallel with the processing of steps S808 and S809. In step S811, the control circuit 104 generates the estimated evaluation image (e.g., the estimated evaluation images C4 to C8 in FIG. 7).

In step S812, the control circuit 104 obtains the sum of the difference between the evaluation image obtained in step S808 and the estimated evaluation image generated in step S811. In step S813, the control circuit 104 determines whether or not the sum of the difference is less than or equal to the threshold. If the sum of the difference is less than or equal to the threshold, the sequence moves to step S814, where the control circuit 104 sets the determination flag to "OK" (e.g., an estimated evaluation image determination corresponding to the evaluation images A4 to A6 and the estimated evaluation images C4 to C6 in FIG. 7). However, if the sum of the difference exceeds the threshold, the sequence moves to step S815, where the control circuit 104 sets the determination flag to "NG" (e.g., an estimated evaluation image determination corresponding to the evaluation images A7 and A8 and the estimated evaluation images C7 and C8 in FIG. 7).

In step S816, the control circuit 104 determines whether or not the determination flag is "OK". If the determination flag is "OK", the sequence moves to step S805. However, if the determination flag is "NG", the sequence skips step S805 and moves to step S806 (i.e., an evaluation value based on the estimated evaluation image is not obtained). Note that the value of the determination flag is the value set in step S800 for the period in which the first still image is captured, whereas the value of the determination flag is the value set in step S814 or S815 for the periods in which the second and subsequent still images are captured.

Note also that a configuration may be employed in which even if the determination flag is "NG", the evaluation value obtainment processing (step S805) itself is performed, but the evaluation value is not used in the various types of control performed by the control circuit 104 thereafter (not shown in FIGS. 8A and 8B).

Additionally, although the generation of the estimated evaluation image in step S804 is performed before the determination of step S816 in the example of FIGS. 8A and 8B, the position of step S804 may be moved to a position between steps S816 and S805. In other words, a configuration may be employed in which when the determination flag is "NG" and an evaluation value based on the estimated evaluation image is not obtained, the generation of the estimated evaluation image itself is not performed. In this case, the estimated evaluation images C9 to C11 in FIG. 7 are not generated.

Additionally, although the present embodiment describes a configuration in which the estimated evaluation image determination processing is absolutely performed at the cycle of the capturing V sync outside of the period T4', the present embodiment is not limited to this configuration. For example, a configuration may be employed in which after a determination of "NG" has been made in the estimated evaluation image determination processing, the evaluation value obtainment processing using the subsequent estimated evaluation images is not performed during the continuous still image shooting period (i.e., while the shutter button is being held down). When such a configuration is employed, the processing of step S814 in FIG. 8B is not performed, and the sequence moves to step S813 to step S810 when the sum of the difference is determined to be less than or equal to the threshold in step S813.

Note that in the present embodiment, when an evaluation value is not obtained using the estimated evaluation image, the evaluation value obtainment processing performed during the still image capturing may be realized through a different method.

As described thus far, according to the second embodiment, the digital camera 100 generates an estimated evaluation image corresponding to a predetermined timing before a period in which the obtainment of the evaluation image is stopped, on the basis of two or more evaluation images obtained before the predetermined timing. The "estimated evaluation image corresponding to a predetermined timing" is, for example, the estimated evaluation image C8 in FIG. 7, and the "two or more evaluation images obtained before the predetermined timing" are, for example, the evaluation images A6 and A7 in FIG. 7. Then, the digital camera 100 determines whether or not a difference between the estimated evaluation image corresponding to the predetermined timing (e.g., the estimated evaluation image C8 in FIG. 7) and an evaluation image obtained at the predetermined timing (e.g., the evaluation image A8 in FIG. 7) exceeds a threshold. This makes it possible to predict error in the estimated evaluation image corresponding to the period in which the obtainment of the evaluation image is stopped, and whether or not the evaluation value corresponding to the stopped period will be used can be switched as appropriate.

Third Embodiment

Figure 9:
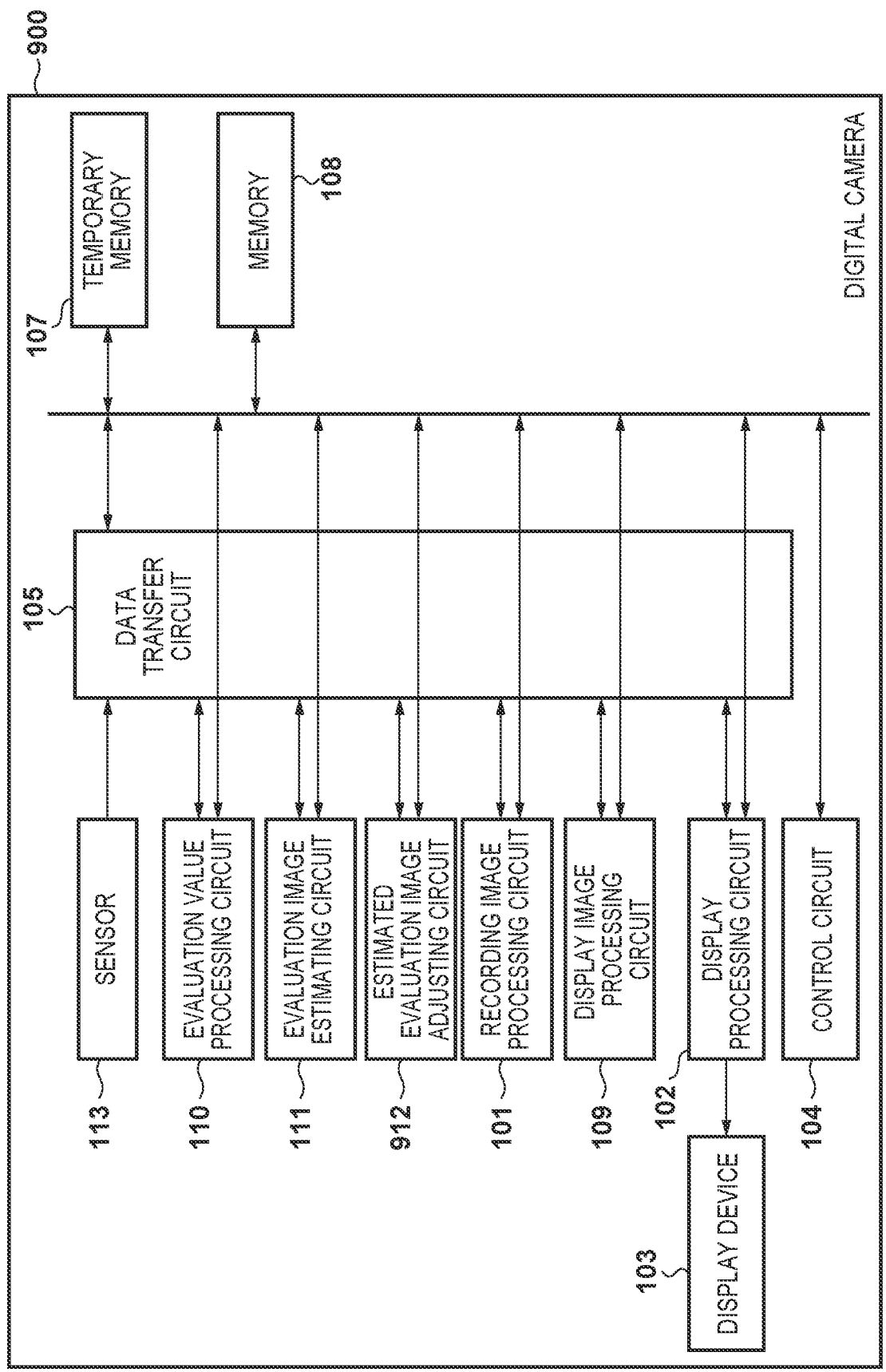
FIG. 9 is a block diagram illustrating the configuration of a digital camera 900 according to a third embodiment.

FIG. 9 is a block diagram illustrating the configuration of a digital camera 900 according to a third embodiment. An estimated evaluation image adjusting circuit 912 performs processing for transforming an estimated evaluation image generated during still image capturing by comparing the estimated evaluation image generated by the evaluation image estimating circuit 111 with an evaluation image captured at the same time and calculating an adjustment value based on a shift amount between the two.

Figure 12:
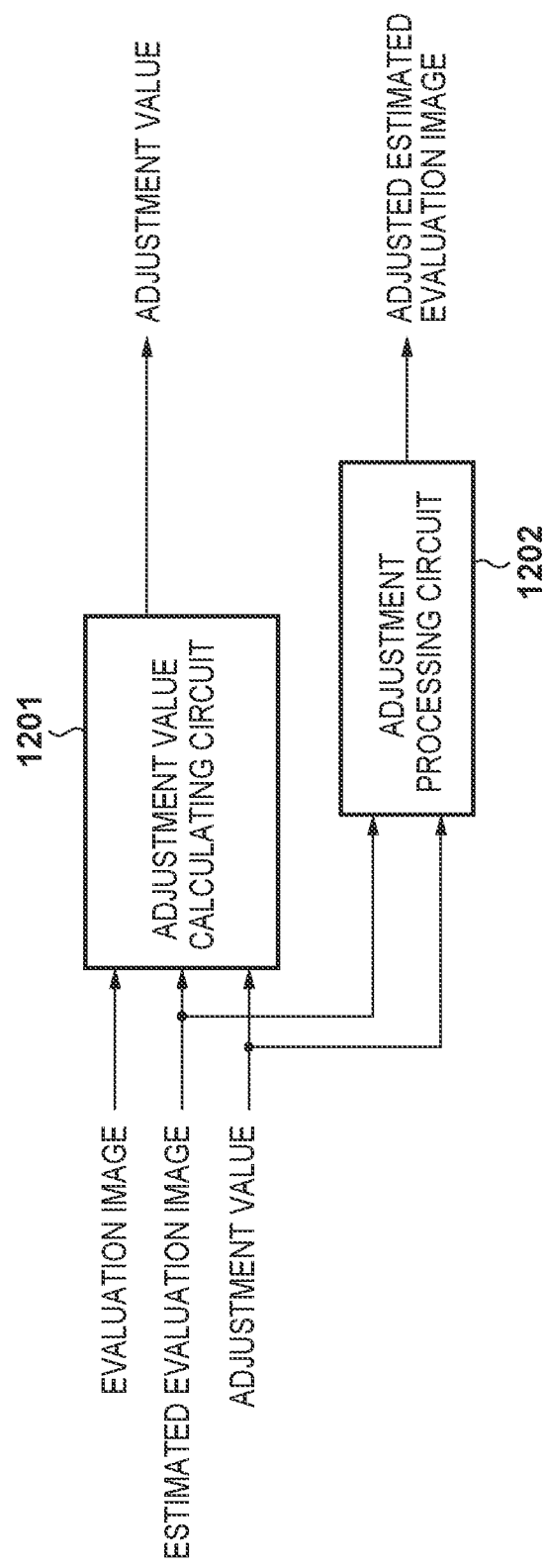
FIG. 12 is a block diagram illustrating, in detail, the configuration of an estimated evaluation image adjusting circuit 912.

FIG. 12 is a block diagram illustrating, in detail, the configuration of the estimated evaluation image adjusting circuit 912. The estimated evaluation image adjusting circuit 912 includes an adjustment value calculating circuit 1201 and an adjustment processing circuit 1202. The adjustment value calculating circuit 1201 calculates the adjustment value on the basis of an evaluation image and an estimated evaluation image input via the data transfer circuit 105. The "adjustment value" is a motion vector value found in units of pixels or in units of quadrangular regions constituted by a plurality of pixels (templates), and is information indicating how much an evaluation image moves relative to an estimated evaluation image. The adjustment value is found through a known motion vector value calculation method, e.g., template matching. As such, the adjustment value is based on a difference between the evaluation image and the estimated evaluation image. The adjustment value which has been found is recorded into the temporary memory 107 via the data transfer circuit 105. The adjustment value is also used as input to the adjustment value calculating circuit 1201. Drastic changes in the adjustment value can be suppressed by feeding back adjustment values of past frames. Note that a configuration may be employed in which the adjustment value is calculated using only the evaluation image and the estimated evaluation image form the current frame.

The adjustment processing circuit 1202 performs processing for transforming the estimated evaluation image input via the data transfer circuit 105 on the basis of the adjustment value also input via the data transfer circuit 105. The adjustment processing circuit 1202 records the transformed estimated evaluation image into the temporary memory 107 via the data transfer circuit 105. The adjustment processing circuit 1202 is constituted by a known geometric transformation processing circuit, and transforms (moves) each of pixels on the basis of the adjustment value. Additionally, during continuous still image shooting, the control circuit 104 performs control for switching the processing executed by the estimated evaluation image adjusting circuit 912 between the adjustment value calculation processing (during the period in which the evaluation image is obtained) and the estimated evaluation image adjustment processing (when capturing a still image).

Figure 10:
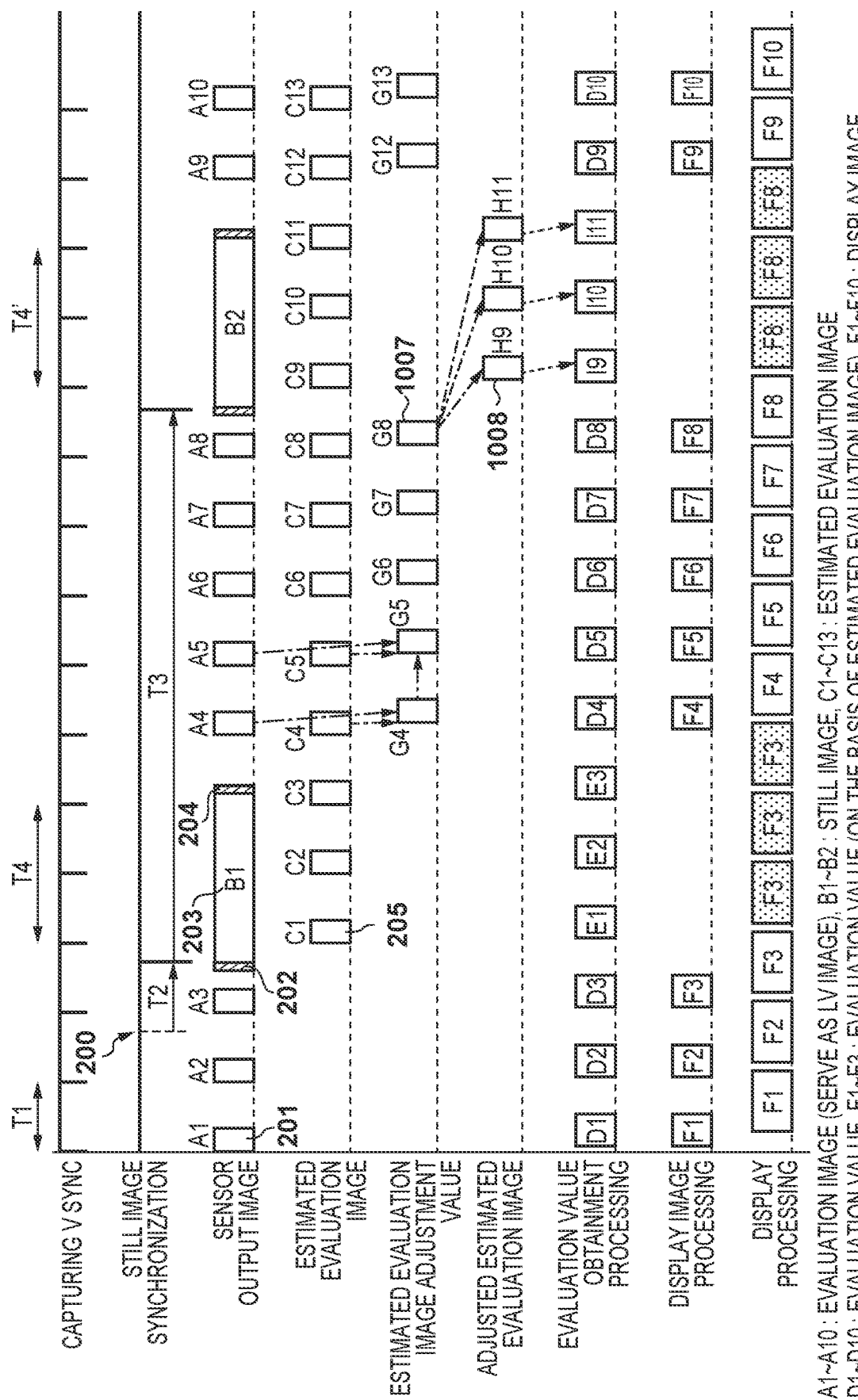
FIG. 10 is a timing chart pertaining to evaluation value obtainment during continuous still image shooting, according to the third embodiment.

FIG. 10 is a timing chart pertaining to evaluation value obtainment during continuous still image shooting, according to the third embodiment. In FIG. 10, the items arranged in the vertical direction indicate various types of timing signals or processing timings, and the horizontal direction corresponds to time. The following will describe points which are different from the timing charts in FIGS. 2 and 7.

"Estimated evaluation image adjustment value" indicates the output timings of adjustment values G4 to G13, which are one of the outputs from the estimated evaluation image adjusting circuit 912. The adjustment values G4 to G13 will be collectively called "adjustment value 1007". The adjustment value calculation processing is started once the capturing of the evaluation image 201 is complete in "sensor output image" and the generation of the estimated evaluation image 205 for that same time is also complete. In the example of FIG. 10, the adjustment value calculation processing is started upon the capturing of the evaluation image A4, immediately after the capturing of the still image B1 is complete, and the generation of the estimated evaluation image C4 corresponding to that same time, are complete. Thereafter, the adjustment value calculation processing is performed at the cycle of the capturing V sync, aside from a period T4'. In the example of FIG. 10, first, the first adjustment value G4 is generated on the basis of the evaluation image A4 and the estimated evaluation image C4, and next, the adjustment value G5 is generated on the basis of the evaluation image A5, the estimated evaluation image C5, and the adjustment value G4. Thereafter, the adjustment values G6 to G8 are generated in the same manner as the adjustment value G5, and the adjustment value G8 calculated immediately before the still image B2 is captured is used in the estimated evaluation image adjustment processing.

"Adjusted estimated evaluation image" indicates the output timings of adjusted estimated evaluation images H9 to H11, which are one of the outputs from the estimated evaluation image adjusting circuit 912. The adjusted estimated evaluation images H9 to H11 will be collectively called an "adjusted estimated evaluation image 1008". The estimated evaluation image adjustment processing is executed for the estimated evaluation images C9 to C11 generated in the period T4'. In the example of FIG. 10, the estimated evaluation images C9 to C11 are adjusted using the adjustment value G8 generated immediately before the still image B2 was captured, and the adjusted estimated evaluation images H9 to H11 are generated as a result.

"Evaluation value obtainment processing" indicates timings of the start and end of evaluation value obtainment processing performed by the evaluation value processing circuit 110. In the present embodiment, unlike the first embodiment (FIG. 2), the evaluation value is obtained on the basis of the adjusted estimated evaluation image 1008, in the period in which the second and subsequent still images are captured (the period T4'). In the example of FIG. 10, evaluation values I9 to I11 are obtained on the basis of the adjusted estimated evaluation images H9 to H11 generated in the period in which the still image B2 is captured (the period T4').

Note that a configuration may be employed in which the estimated evaluation image generating processing is executed even before the start of continuous shooting (the timings of evaluation images A1 to A3). In this case, a configuration may be employed in which the adjustment value calculation processing is performed even before the start of continuous shooting (at the timings of the evaluation images A1 to A3). In this case, a configuration may be employed in which the estimated evaluation image adjustment processing is performed on the basis of the immediately-previous adjustment value even for the period in which the first still image is captured (the period T4'), and the evaluation value is obtained on the basis of the adjusted estimated evaluation image.

Figure 11A:
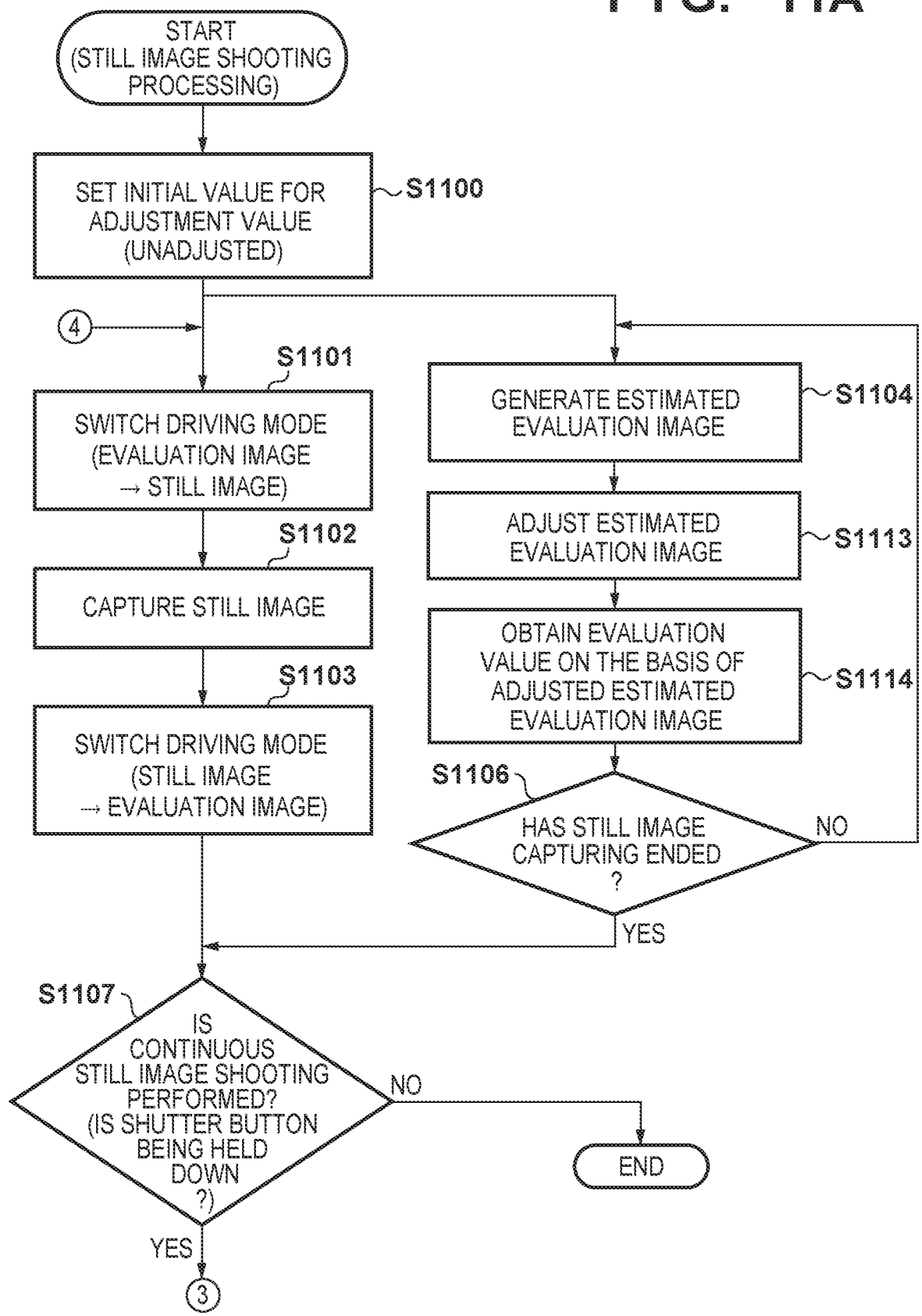
FIGS. 11A and 11B are flowcharts illustrating still image shooting processing according to the third embodiment.
Figure 11B:
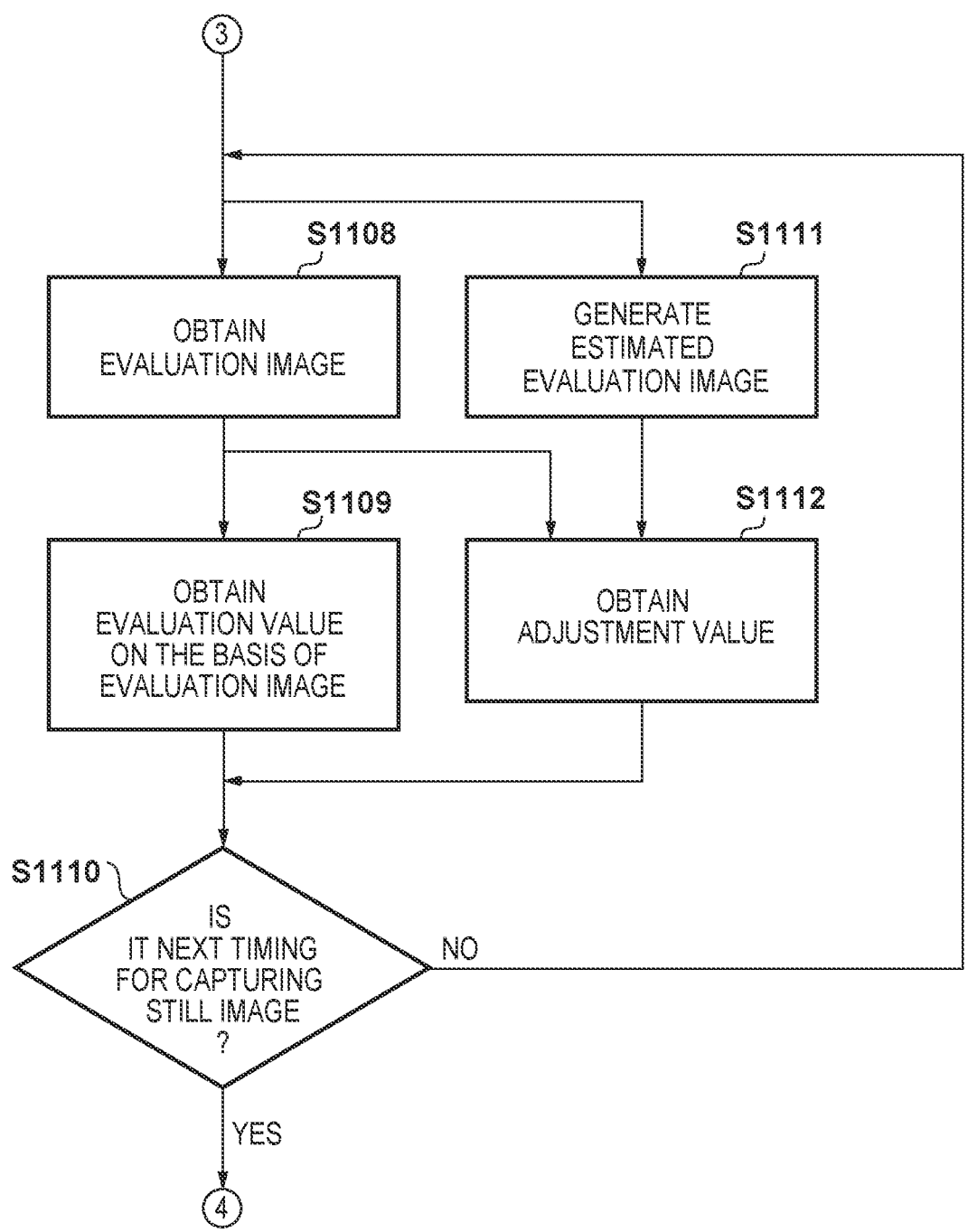

FIGS. 11A and 11B are flowcharts illustrating still image shooting processing according to the third embodiment. Unless otherwise specified, the processing of each step in this flowchart is realized by the control circuit 104 controlling the respective circuits of the digital camera 100 in accordance with programs stored in the memory 108. The processing of this flowchart starts when an instruction to capture a still image (e.g., the shutter button being pressed) is detected (see timing 200 in FIG. 10) and the first still image synchronization signal is detected. The control of the "sensor output image", the "estimated evaluation image", the "estimated evaluation image adjustment value", the "adjusted estimated evaluation image", and the "evaluation value obtainment processing" in the timing chart in FIG. 10 is performed according to this flowchart.

Note that the processing of steps S1101 to S1104 and steps S1106 to S1110 is the same as the processing of steps S401 to S404 and S406 to S410 in FIG. 4. Additionally, before the processing of this flowchart is started, the control circuit 104 repeatedly executes the same processing as that of steps S1108 and S1109 to repeatedly obtain evaluation images and evaluation values (e.g., the evaluation images A1 to A3 and the evaluation values D1 to D3 in FIG. 10).

In step S1100, the control circuit 104 sets an initial value for the adjustment value. In the present embodiment, a configuration is employed in which the estimated evaluation image is not adjusted when capturing the first still image, and thus the initial value is set to a value corresponding to "unadjusted".

The processing of steps S1111 to S1112 is executed repeatedly at the cycle of the capturing V sync, in parallel with the processing of steps S1108 and S1109. In step S1111, the control circuit 104 generates the estimated evaluation image (e.g., the estimated evaluation images C4 to C8 in FIG. 10).

In step S1112, the control circuit 104 performs processing for calculating the adjustment values required for the estimated evaluation image adjustment processing (e.g., the adjustment values G4 to G8).

In step S1113, the control circuit 104 performs the estimated evaluation image adjustment processing on the estimated evaluation image generated in step S1104, on the basis of the newest adjustment value (the initial value set in step S1100 or the adjustment value obtained in the latest instance of step S1112). For example, in the period T4' in FIG. 10, processing for adjusting the estimated evaluation images C9 to C11 is performed on the basis of the adjustment value G8, and the adjusted estimated evaluation images H9 to H11 are generated as a result.

In step S1114, the control circuit 104 obtains the evaluation value on the basis of the adjusted estimated evaluation image generated in step S1113 (e.g., the evaluation values I9 to I11 in FIG. 10).

Note that a configuration for generating an image corresponding to the evaluation image on the basis of a still image may be added to the digital camera 900. In this case, the digital camera 900 may be configured to obtain the adjustment value by performing the adjustment value calculation processing on the basis of a difference between an evaluation image generated on the basis of a still image (e.g., the still image B2 in FIG. 10) and an estimated evaluation image generated at a time near the capturing of the still image (e.g., the estimated evaluation image C8 in FIG. 10).

As described thus far, according to the third embodiment, the digital camera 100 generates an estimated evaluation image corresponding to a predetermined timing before a period in which the obtainment of the evaluation image is stopped, on the basis of two or more evaluation images obtained before the predetermined timing. The "estimated evaluation image corresponding to a predetermined timing" is, for example, the estimated evaluation image C8 in FIG. 10, and the "two or more evaluation images obtained before the predetermined timing" are, for example, the evaluation images A6 and A7 in FIG. 10. Then, the digital camera 100 adjusts the estimated evaluation image corresponding to the stopped period on the basis of the estimated evaluation image corresponding to the predetermined timing (e.g., the estimated evaluation image C8 in FIG. 10) and an evaluation image obtained at the predetermined timing (e.g., the evaluation image A8 in FIG. 10). This makes it possible to improve the accuracy of the estimated evaluation image corresponding to the stopped period, and to improve the accuracy of the evaluation value generated on the basis of the estimated evaluation image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-154972, filed Aug. 27, 2019 which is hereby incorporated by reference herein in its entirety.

What is claimed is:

1. An image capturing control apparatus comprising at least one processor and/or at least one circuit which functions as:

a first control unit configured to perform control to repeatedly obtain an evaluation image using an image sensor, the evaluation image being used to obtain an evaluation value for controlling at least one of image capturing and development;

an obtaining unit configured to obtain the evaluation value on the basis of the evaluation image;

a second control unit configured to perform control to temporarily stop the obtainment of the evaluation image and use the image sensor to obtain, during a stopped period, a still image for recording; and a generating unit configured to generate an estimated evaluation image corresponding to the stopped period on the basis of two or more evaluation images obtained outside the stopped period, wherein for the stopped period, the obtaining unit obtains the evaluation value on the basis of the estimated evaluation image.

2. The image capturing control apparatus according to claim 1,
wherein the first control unit performs control to repeatedly obtain the evaluation image at a predetermined cycle; and
the generating unit generates the estimated evaluation image so that the estimated evaluation image corresponds to a timing synchronized with the predetermined cycle within the stopped period.

3. The image capturing control apparatus according to claim 2,
wherein when a plurality of timings synchronized with the predetermined cycle are present in the stopped period, for each one of the plurality of timings, the generating unit generates an estimated evaluation image corresponding to the one timing on the basis of an evaluation image or an estimated evaluation image corresponding to a timing two instances before the one timing and an evaluation image or an estimated evaluation image corresponding to a timing one instance before the one timing.

4. The image capturing control apparatus according to claim 1,
wherein the generating unit generates an estimated evaluation image corresponding to a predetermined timing before the stopped period on the basis of two or more evaluation images obtained before the predetermined timing; and
the at least one processor and/or at least one circuit further functions as a determining unit configured to determine whether or not a difference between the estimated evaluation image corresponding to the predetermined timing and the evaluation image obtained at the predetermined timing exceeds a threshold.

5. The image capturing control apparatus according to claim 4,
wherein when the difference is determined to exceed the threshold, the obtaining unit does not obtain the evaluation value for the stopped period.

6. The image capturing control apparatus according to claim 4, wherein the at least one processor and/or at least one circuit further functions as:
a third control unit configured to perform control so that, when the difference is determined to exceed the threshold, the evaluation value obtained on the basis of the estimated evaluation image for the stopped period is not used for the control of at least one of the image capturing and the development.

7. The image capturing control apparatus according to claim 4,
wherein when the difference is determined to exceed the threshold, the generating unit does not generate the estimated evaluation image corresponding to the stopped period.

8. The image capturing control apparatus according to claim 1,
wherein the generating unit generates an estimated evaluation image corresponding to a predetermined timing before the stopped period on the basis of two or more evaluation images obtained before the predetermined timing; and
the at least one processor and/or at least one circuit further functions as an adjusting unit configured to adjust the estimated evaluation image corresponding to the stopped period on the basis of a difference between the estimated evaluation image corresponding to the predetermined timing and the evaluation image obtained at the predetermined timing.

9. The image capturing control apparatus according to claim 1,
wherein the generating unit generates an estimated evaluation image corresponding to a predetermined timing before the stopped period on the basis of two or more evaluation images obtained before the predetermined timing; and
the at least one processor and/or at least one circuit further functions as an adjusting unit configured to generate an image corresponding to an evaluation image of the stopped period on the basis of the still image obtained in the stopped period, and adjust the estimated evaluation image corresponding to the stopped period on the basis of a difference between the generated image and the estimated evaluation image corresponding to the predetermined timing.

10. The image capturing control apparatus according to claim 1,
wherein the generating unit generates the estimated evaluation image using a training model.

11. The image capturing control apparatus according to claim 1,
wherein the obtaining unit obtains two or more types of evaluation values.

12. The image capturing control apparatus according to claim 1,
wherein the evaluation value indicates one of a focus state, exposure, white balance, a type of a subject, and motion of a subject.

13. An image capturing apparatus, comprising:
the image capturing control apparatus according to claim 1; and
the image sensor.

14. A control method executed by an image capturing control apparatus, comprising:
performing control to repeatedly obtain an evaluation image using an image sensor, the evaluation image being used to obtain an evaluation value for controlling at least one of image capturing and development;
obtaining the evaluation value on the basis of the evaluation image;
performing control to temporarily stop the obtainment of the evaluation image and use the image sensor to obtain, during a stopped period, a still image for recording; and
generating an estimated evaluation image corresponding to the stopped period on the basis of two or more evaluation images obtained outside the stopped period,
wherein for the stopped period, the evaluation value is obtained on the basis of the estimated evaluation image.

15. A non-transitory computer-readable storage medium which stores a program for causing a computer to execute a control method comprising:
performing control to repeatedly obtain an evaluation image using an image sensor, the evaluation image being used to obtain an evaluation value for controlling at least one of image capturing and development;
obtaining the evaluation value on the basis of the evaluation image;
performing control to temporarily stop the obtainment of the evaluation image and use the image sensor to obtain, during a stopped period, a still image for recording; and generating an estimated evaluation image corresponding to the stopped period on the basis of two or more evaluation images obtained outside the stopped period, wherein for the stopped period, the evaluation value is obtained on the basis of the estimated evaluation image.

\* \* \* \* \*